(12) United States Patent
Hatada

(10) Patent No.: US 8,527,680 B2
(45) Date of Patent: Sep. 3, 2013

(54) USB PORTABLE DEVICE HAVING SWITCHING FUNCTION

(75) Inventor: Masahiro Hatada, Kanazawa (JP)

(73) Assignee: I-O Data Device, Inc., Kanazawa-shi, Ishikawa (JP)

( * ) Notice: Subject to any disclaimer, the term of this patent is extended or adjusted under 35 U.S.C. 154(b) by 256 days.

(21) Appl. No.: 12/863,233

(22) PCT Filed: Jan. 16, 2008

(86) PCT No.: PCT/JP2008/050415
§ 371 (c)(1),
(2), (4) Date: Sep. 28, 2010

(87) PCT Pub. No.: WO2009/090734
PCT Pub. Date: Jul. 23, 2009

(65) Prior Publication Data
US 2011/0016256 A1      Jan. 20, 2011

(51) Int. Cl.
*G06F 13/00*     (2006.01)

(52) U.S. Cl.
USPC ............. 710/104; 711/115; 713/182; 726/26

(58) Field of Classification Search
USPC ................. 710/8–10, 16, 104, 313; 711/115; 713/182–185, 193; 726/2, 16, 17, 21, 26, 726/28, 30
See application file for complete search history.

(56) References Cited

U.S. PATENT DOCUMENTS

| | | | |
|---|---|---|---|
| 6,823,459 B1 | 11/2004 | Horikoshi et al. | |
| 7,039,759 B2 * | 5/2006 | Cheng et al. | 711/115 |
| 7,237,046 B2 | 6/2007 | Paley et al. | |
| 7,606,946 B2 | 10/2009 | Kobayashi et al. | |
| 2001/0023485 A1 | 9/2001 | Yashiki et al. | |
| 2004/0103288 A1* | 5/2004 | Ziv et al. | 713/185 |
| 2004/0193744 A1* | 9/2004 | Paley et al. | 710/5 |
| 2006/0161749 A1* | 7/2006 | Chen et al. | 711/164 |
| 2006/0184806 A1* | 8/2006 | Luttmann et al. | 713/193 |
| 2006/0190941 A1 | 8/2006 | Kobayashi et al. | |
| 2007/0083939 A1* | 4/2007 | Fruhauf et al. | 726/34 |
| 2007/0124534 A1 | 5/2007 | Iwata | |

FOREIGN PATENT DOCUMENTS

| | | |
|---|---|---|
| EP | 1 653 366 A1 | 5/2006 |
| JP | 7-234759 | 9/1995 |
| JP | 10-289159 | 10/1998 |
| JP | 2000-259571 A | 9/2000 |
| JP | 2001-265582 | 9/2001 |
| JP | 2002-245787 A | 8/2002 |

(Continued)

OTHER PUBLICATIONS

Japanese Office Action for Application No. 2009-549925 dated Apr. 24, 2010.

(Continued)

*Primary Examiner* — Glenn A Auve

(74) *Attorney, Agent, or Firm* — Merchant & Gould P.C.

(57) ABSTRACT

A USB portable device includes an activating USB peripheral, a storing USB peripheral, and a controlling USB peripheral. If the USB portable device is connected to a host apparatus, the activating USB peripheral is recognized as a readable device and a switching program in the recognized readable device is read in the host apparatus and is executed. Consequently, a switching instruction is received from the host apparatus, the readable device is unmounted, and the storing USB peripheral is recognized as the readable device.

6 Claims, 8 Drawing Sheets

(56) References Cited

FOREIGN PATENT DOCUMENTS

| JP | 2003-85042 A | 3/2003 |
| JP | 2003-178017 | 6/2003 |
| JP | 2004-151785 | 5/2004 |
| JP | 2004-206660 | 7/2004 |
| JP | 2005-115636 | 4/2005 |
| JP | 2006-202339 | 8/2006 |
| JP | 2006-286008 | 10/2006 |
| JP | 2006-528378 | 12/2006 |
| JP | 2007-148644 | 6/2007 |
| JP | 2007-265096 | 10/2007 |

OTHER PUBLICATIONS

Extended European Search Report for corresponding European Patent Application No. 08703276.9 mailed Dec. 14, 2011.

Japanese Office Action for JP 2009-549925.

* cited by examiner

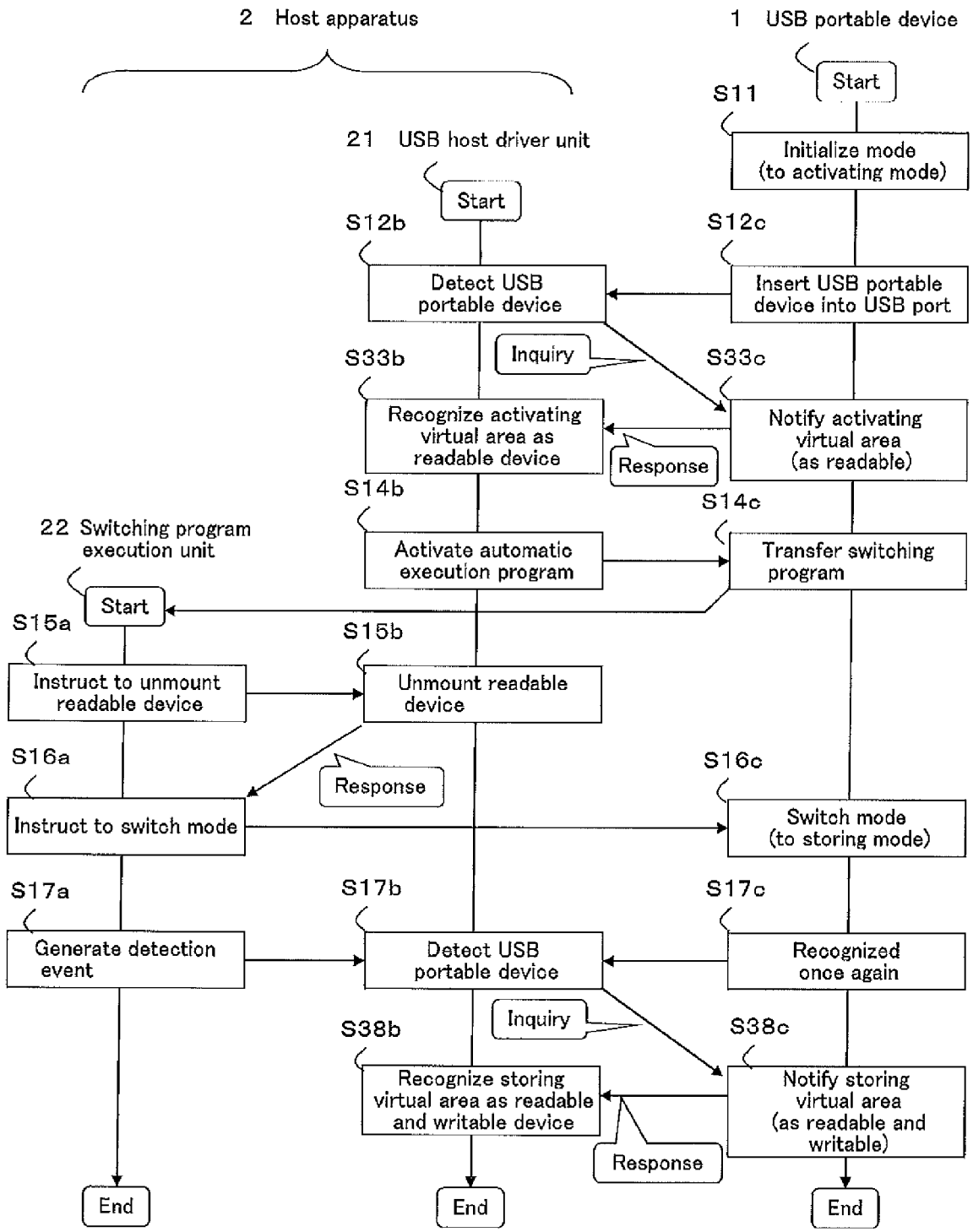

USB PORTABLE DEVICE HAVING SWITCHING FUNCTION

TECHNICAL FIELD

This application is a National Stage Application of PCT/JP2008/050415, filed 16 Jan. 2008, and which application is incorporated herein by reference. To the extent appropriate, a claim of priority is made to the above disclosed application.

The present invention relates to a USB portable device.

BACKGROUND ART

Rewritable portable media such as a USB (Universal Serial Bus) memory have been widely used. A portable medium is connected to a PC (Personal Computer) as a host, is recognized by the PC, and receives a rewrite access from the PC for rewriting data stored in a storage area of the portable medium.

A single portable medium can physically have therein a plurality of storage areas.

Patent Document 1 discloses that a storage area of a mass storage medium is effectively used by logically dividing the storage area into a plurality of divided areas and using a logical unit number for each of a plurality of the divided areas.

Patent Document 2 discloses that an access into an access limit area is limited by conducting authentication for the access.

Patent Document 3 discloses that, if a storage area is not suitable for specifications of an OS (Operating System), the storage area can be hidden.

Patent Documents 4 and 5 disclose that connection of a virtual device in a portable medium is controlled such that a privileged user can use the virtual device but the others cannot.

Patent Document 1: Japanese Laid-Open Patent Application, Publication No. H07-234759
Patent Document 2: Japanese Laid-Open Patent Application, Publication No. H10-289159
Patent Document 3: Japanese Laid-Open Patent Application, Publication No. 2005-115636
Patent Document 4: Japanese Laid-Open Patent Application, Publication No. 2006-202339
Patent Document 5: Japanese Laid-Open Patent Application, Publication No. 2006-286008

DISCLOSURE OF THE INVENTION

Problems to be Solved by the Invention

Some portable media store therein an automatic execution program. If the automatic execution program is connected to a host, the program is read and executed by the host. The automatic execution program is preinstalled in a portable medium by, for example, a distributor before the portable medium is distributed. It is not desirable for the distributor that the automatic execution program is fraudulently deleted or falsified. The technique of Patent Document 2 thus deals with such a fraudulent access into an access limit area by authentication for the access. However, if a portable medium receives a large number of accesses, its performance is deteriorated accompanied by necessary processing for the authentication (for example, a decrease in transfer rate).

Moreover, in the techniques according to the related art, an OS recognizes a plurality of drives, which is not convenient for a user.

The present invention has been made in an attempt to solve the above described problems and to provide a portable medium with an automatic execution program stored therein, capable of preventing a fraudulent access while enhancing convenience of a user.

Means for Solving the Problems

To solve the above described problems, the present invention provides a USB portable device storing therein a switching program which is executed by being connected to a host apparatus, including:
an activating USB functioning unit that stores therein the switching program;
a storing USB functioning unit that permits a read and a write from the host apparatus; and
a controlling USB functioning unit that switches a device to be recognized by the host apparatus,
wherein the controlling USB functioning unit
makes the host apparatus recognize the activating USB functioning unit as a readable device, if the USB portable device is connected to the host apparatus,
receives, from the host apparatus, a switching instruction which is given by a read and an execution of the switching program in the recognized readable device from the host apparatus, and
makes the host apparatus unmount the readable device and then makes the host apparatus recognize the storing USB functioning unit as a readable and writable device.
Other means for solving the problems will be described hereinafter.

Advantageous Effects of the Invention

The present invention enables a portable medium storing therein an automatic execution program to be prevented from a fraudulent access while enhancing convenience of a user.

BRIEF DESCRIPTION OF THE DRAWINGS

FIG. 7 A flowchart illustrating operations in which a device is recognized for each virtual area according to the third embodiment of the present invention.

DESCRIPTION OF REFERENCE CHARACTERS

Figure 1A:
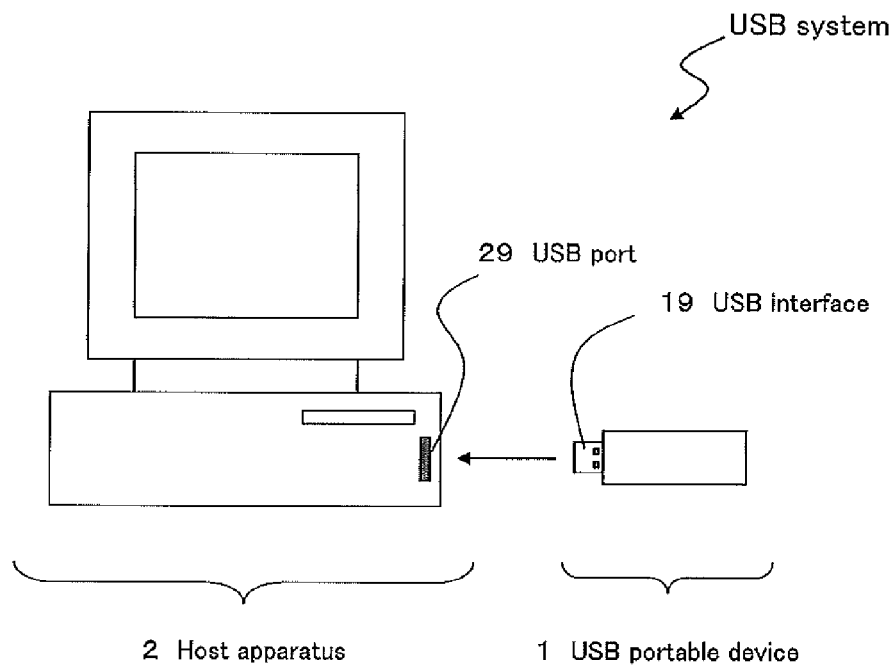
FIG. 1A and FIG. 1B Configuration diagrams each illustrating a USB system according to each embodiment of the present invention.

1 USB portable device
11 Switching program

12 USB peripheral
12a Activating USB peripheral
12b Storing USB peripheral
12c Controlling USB peripheral
13 Memory chip
13a Activating memory chip
13b Storing memory chip
14a Activating virtual area
14b Storing virtual area
15 Controller
16 Interface unit
17 CPU
18a USB hub
18b Port switch
19 USB interface
2 Host apparatus
21 USB host driver unit
22 Switching program execution unit
29 USB port

BEST MODE FOR CARRYING OUT THE INVENTION

Below is described in detail an embodiment of a program distribution system to which the present invention is applied, with reference to related drawings.

FIG. 1A is a configuration diagram illustrating a USB system. The USB system is configured by connecting a host apparatus 2 that realizes a feature as a host in USB standard, and a USB portable device 1 that realizes a feature as a function in USB standard. The connection is conducted by inserting a USB interface 19 of the USB portable device 1 into a USB port 29 of the host apparatus 2.

The USB portable device 1 is configured as, for example, a USB memory at least including: a flash memory as a storage unit; and a control circuit chip (such as a CPU 17 shown in FIG. 1B to be described later) which performs a control processing. The storage unit of the USB portable device 1 may be not only the flash memory but also other media such as a HDD (Hard Disk Drive) and a removable SD card.

Figure 1B:
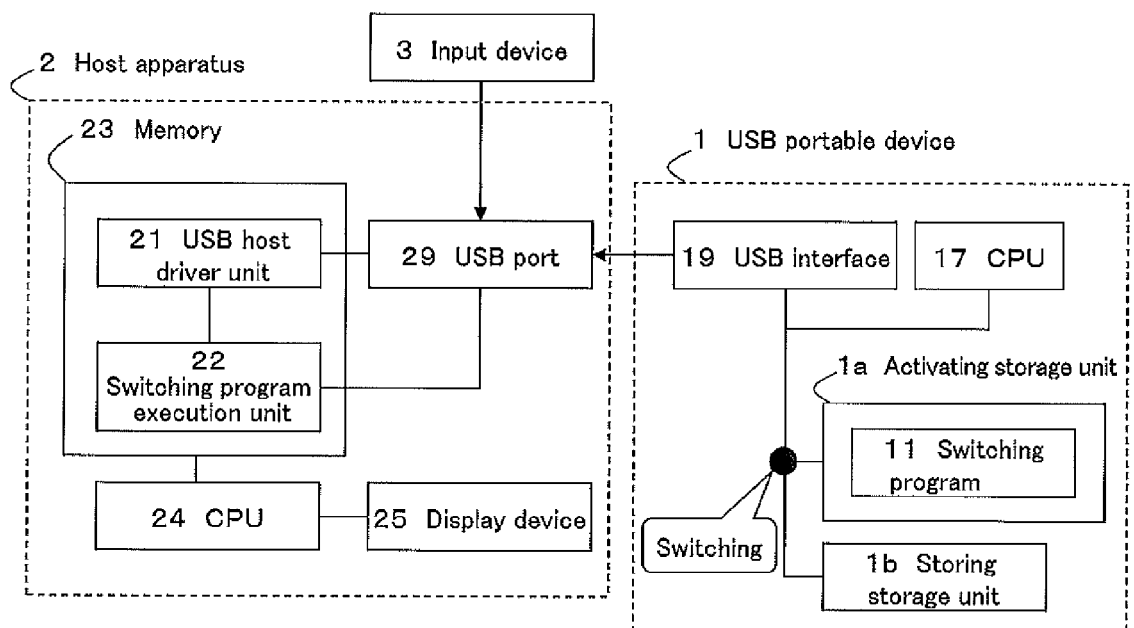
Figure 2:
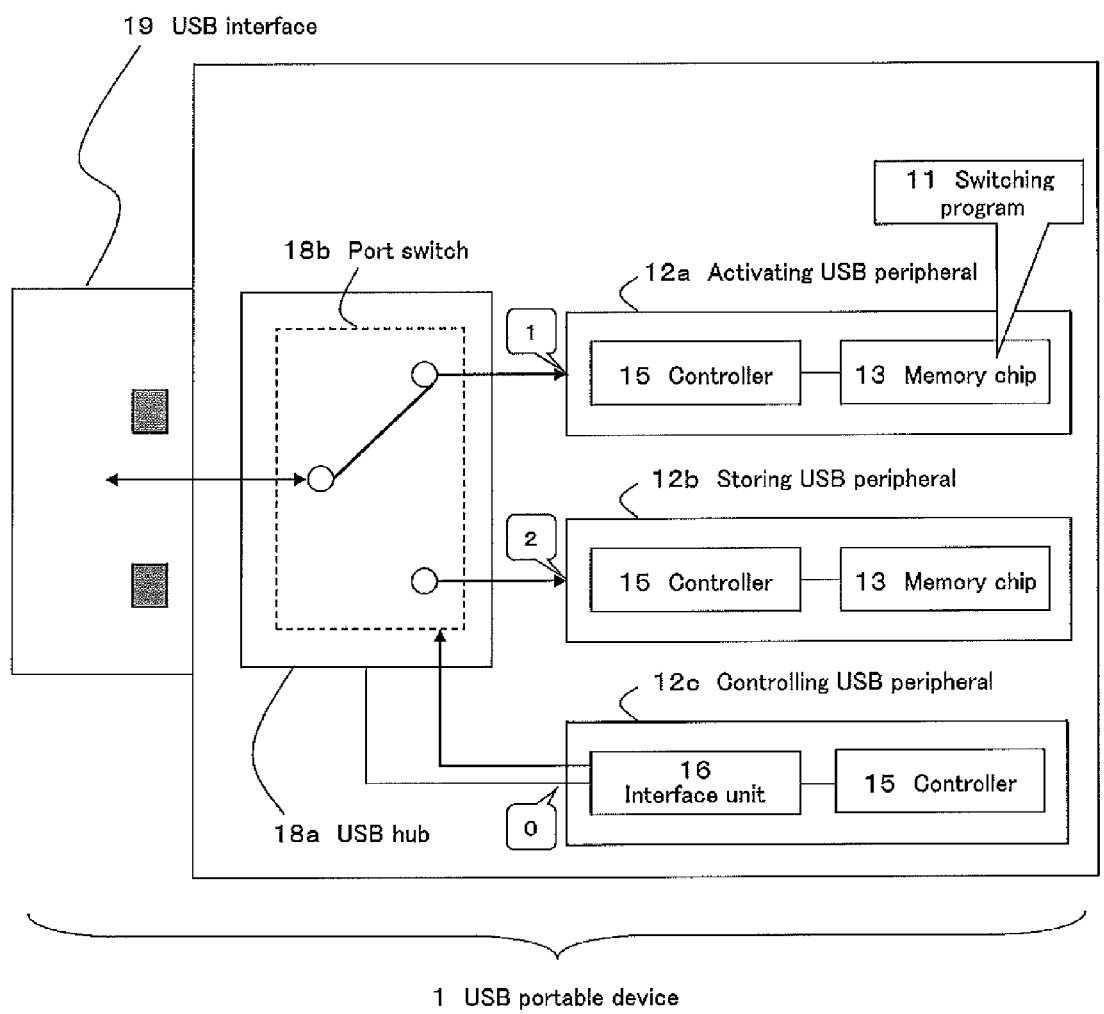
FIG. 2 A configuration diagram illustrating a USB portable device in which a device is recognized for each USB peripheral according to a first embodiment of the present invention.

FIG. 1B is a configuration diagram illustrating insides of the USB portable device 1 and the host apparatus 2. The host apparatus 2 includes: a USB host driver unit 21; a switching program execution unit 22; and a USB port 29.

The host apparatus 2 is configured as a computer at least including: a memory 23 as a storage unit which is used in performing an arithmetic processing; and an arithmetic processing unit which performs the arithmetic processing. The memory 23 may be a RAM (Random Access Memory) or the like. The arithmetic processing unit configured by a CPU (Central Processing Unit) 24 performs the arithmetic processing by executing a program in the memory 23.

The host apparatus 2 has a display device 25 on which data or the like is displayed.

The host apparatus 2 receives a data input via the USB port 29 from the input device 3 which is connected thereto, such as a keyboard and a mouse.

To solve the above described problems, the present invention provides a USB portable device storing therein a switching program which is executed by being connected to a host apparatus, including:

an activating USB functioning unit that stores the switching program in a readable and writable storage means thereof;

a storing USB functioning unit that permits a read and a write from the host apparatus; and a controlling USB functioning unit that switches one of the USB functioning units recognized by the host apparatus to another one to be recognized by the host apparatus, wherein the controlling USB functioning unit
makes the host apparatus:
recognize the storage means of the activating USB functioning unit as a readable device upon connection of the USB portable device to the host apparatus, and
read the switching program in the recognized readable device into the host apparatus; then
the host apparatus: executes the switching program read therein, unmounts the readable device, and sends a switching instruction having a prescribed flag enabled to the controlling USB functioning unit; and then the controlling USB functioning unit: makes the host apparatus recognize the storing USB functioning unit as a readable and writable device, and thereby accepts a read or write instruction having the prescribed flag disabled, and performs an access control in which a fraudulent write instruction to the readable device, the instruction having the prescribed flag disabled, is ignored during a time period from when the readable device is recognized by the host apparatus until when the readable device is unmounted.

Figure 3:
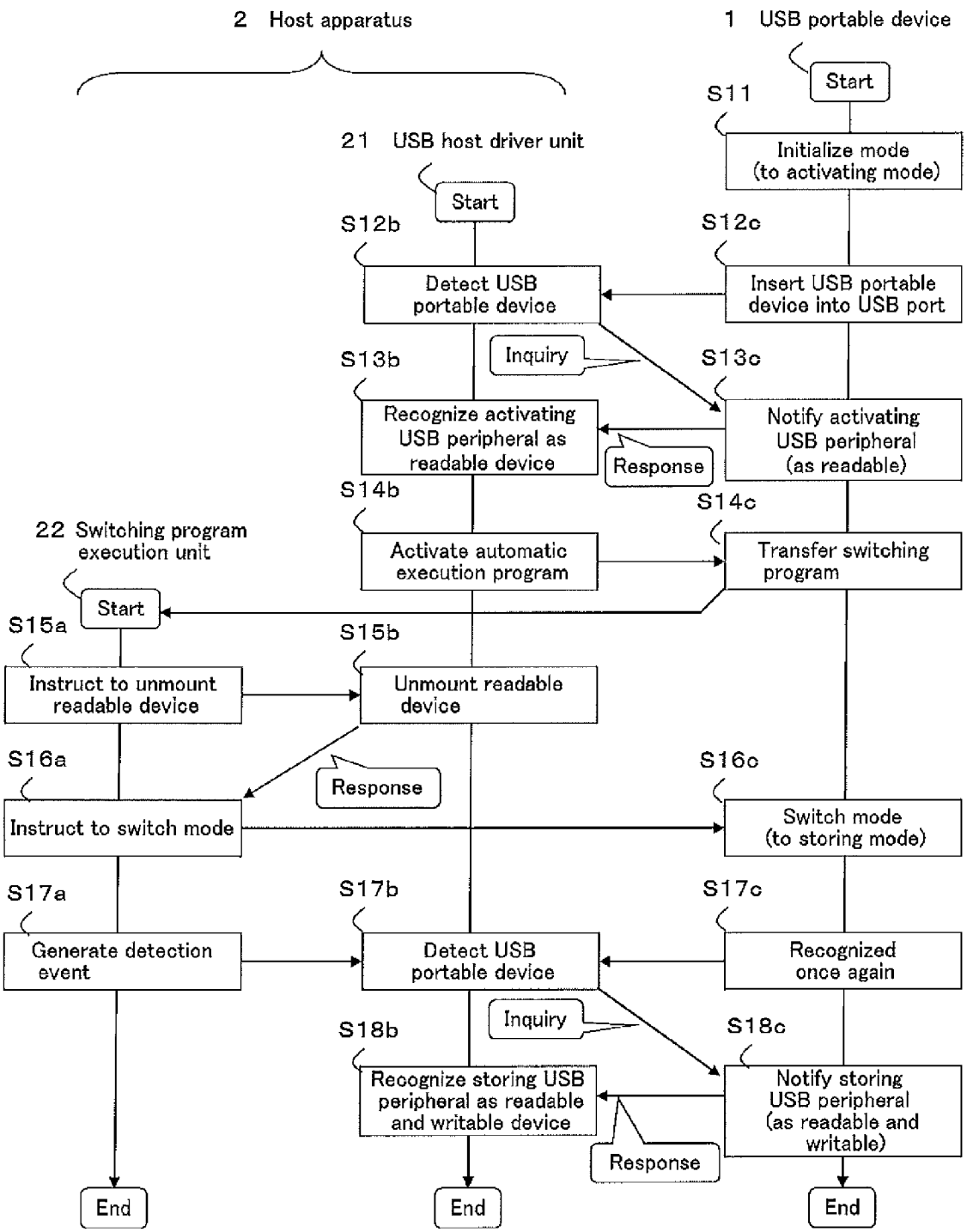
FIG. 3 A flowchart illustrating operations in which a device is recognized for each USB peripheral according to the first embodiment.

FIG. 3 is a flowchart illustrating operations in which a device is recognized for each USB peripheral.

The USB portable device 1, before inserted in the host apparatus 2, initializes a mode thereof at an activating mode (S11). In the activating mode, the controlling USB peripheral 12c connected to the port "0" and the activating USB peripheral 12a connected to the port "1" are in the "ON" state. The storing USB peripheral 12b connected to the port "2" is in the "OFF" state.

If the USB interface 19 of the USB portable device 1 is inserted into the USB port 29 of the host apparatus 2 (S12c), the USB host driver unit 21 detects the inserted USB portable device 1 (S12b). Upon the detection, the USB host driver unit 21 performs recognition (enumeration) of the detected USB portable device 1. More specifically, the USB host driver unit 21 inquires of the USB portable device 1 which device is available. In response to the inquiry, the USB portable device 1 notifies the USB host driver unit 21 that the activating USB peripheral 12a, which is in the "ON" state, is a readable device (S13c) and that the switching program 11 stored in the readable device is an auto-run (automatic execution) program.

Upon receiving the response, the USB host driver unit 21 recognizes the activating USB peripheral 12a as the readable device (S13b). The USB host driver unit 21 transmits, to the USB portable device 1, a transfer instruction to activate the recognized switching program 11 in the readable device as the automatic execution program (S14b). The USB portable device 1 transfers the switching program 11 to the host apparatus 2 (S14c). The host apparatus 2 starts execution of the switching program 11, which makes the switching program execution unit 22 operate.

The switching program execution unit 22 transmits an instruction to unmount the readable device to the USB host driver unit 21 (S15a). Upon receiving the instruction, the USB host driver unit 21 unmounts the readable device recognized in S13b (S15b). Note that the switching program 11 has already been transferred to the host apparatus 2 and executed as the switching program execution unit 22. Thus, the unmount does not interrupt the execution of the switching program 11.

If the switching program execution unit 22 is notified that the unmount in S15b has been completed, the switching program execution unit 22 gives the USB portable device 1 an instruction to switch modes thereof from the activating mode in S11 to the storing mode (S16a). Following the instruction, the USB portable device 1 switches the modes to the storing mode (S16c). In the storing mode, the controlling USB peripheral 12c connected to the port "0" and the storing USB peripheral 12b connected to the port "2" are in the "ON" state. The activating USB peripheral 12a connected to the port "1" is in the "OFF" state.

Upon switching to the storing mode, the controller 15 of the controlling USB peripheral 12c gives the port switch 18b an instruction to change connections from the activating USB peripheral 12a to the storing USB peripheral 12b.

The switching program execution unit 22 generates a detection event similar to an event generated when the USB portable device 1 is inserted into the USB port 29 (S12c) in order for the USB host driver unit 21 to recognize another device of the USB portable device 1 (S17a). The USB host driver unit 21 receives the detection event and detects the already-inserted USB portable device 1 once again (S17b, S17c). In response to the detection, the USB host driver unit 21 performs recognition (enumeration) of the detected USB portable device 1 for a second time.

In the second recognition (enumeration), the USB host driver unit 21 inquires of the USB portable device 1 which device is available. In response to the inquiry, the USB portable device 1 notifies the USB host driver unit 21 that the storing USB peripheral 12b, which is in the "ON" state, is a readable and writable device (S18c). Upon receiving the response, the USB host driver unit 21 recognizes the storing USB peripheral 12b as the readable and writable device (S18b).

Then, the host apparatus 2 can read and write data in the storing USB peripheral 12b which has already been recognized. Meanwhile, the unmounted activating USB peripheral 12a is not at all visible from the USB host driver unit 21 at this time. This conveniently eliminates need for reading or writing data in the activating USB peripheral 12a.

In this embodiment as described above, two areas, one which is readable in the activating USB peripheral 12a and the other which is readable and writable in the storing USB peripheral 12b can be efficiently used by switching over the two areas, while reducing fraudulent access to the activating USB peripheral 12a.

Figure 4:
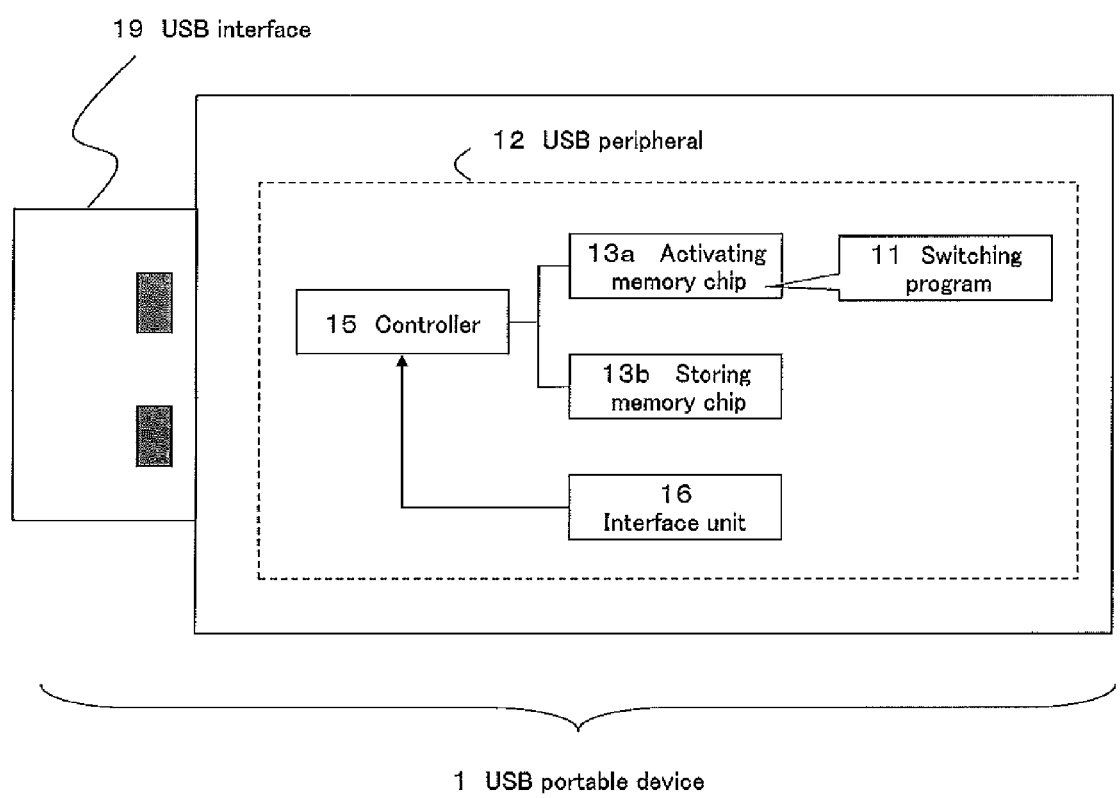
FIG. 4 A configuration diagram illustrating the USB portable device in which a device is recognized for each memory chip according to a second embodiment of the present invention.

Next is described the second embodiment. FIG. 4 is a configuration diagram illustrating the USB portable device 1 in which a device is recognized for each memory chip. The USB portable device 1 includes a USB peripheral 12. The USB peripheral 12 includes memory chips (an activating memory chip 13a and a storing memory chip 13b); the controller 15 controlling a read and a write of data from and into the memory chips; and the interface unit 16 controlling the controller 15. Note that the activating memory chip 13a corresponds to the activating storage unit 1a of FIG. 1B. The storing memory chip 13b corresponds to the storing storage unit 1b of FIG. 1B.

The controller 15 connects either one of the activating memory chip 13a and the storing memory chip 13b, to the USB interface 19. The controller 15 thus sets each of the memory chips at either the "ON" state or the "OFF" state.

The activating memory chip 13a and the storing memory chip 13b are alternately switchable between the "ON" state and the "OFF" state. If one of the memory chips 13a, 13b is in the "ON" state, the other is always in the "OFF" state, and vice versa. In other words, it is not possible in this embodiment that both of the peripherals 12a, 12b are for example in the "ON" state at the same time.

The activating memory chip 13a stores therein the switching program 11. The switching program 11 is to be automatically run.

The interface unit 16 receives, from the switching program execution unit 22 via the USB interface 19, an instruction to designate one memory chip for being connected, from either the activating memory chip 13a or the storing memory chip 13b and operates the controller 15 according to the instruction. The interface unit 16 is recognized as a HID (Human Interface Device) class in USB standard by the USB host driver unit 21 so as to perform control communication with the host apparatus 2.

Figure 5:
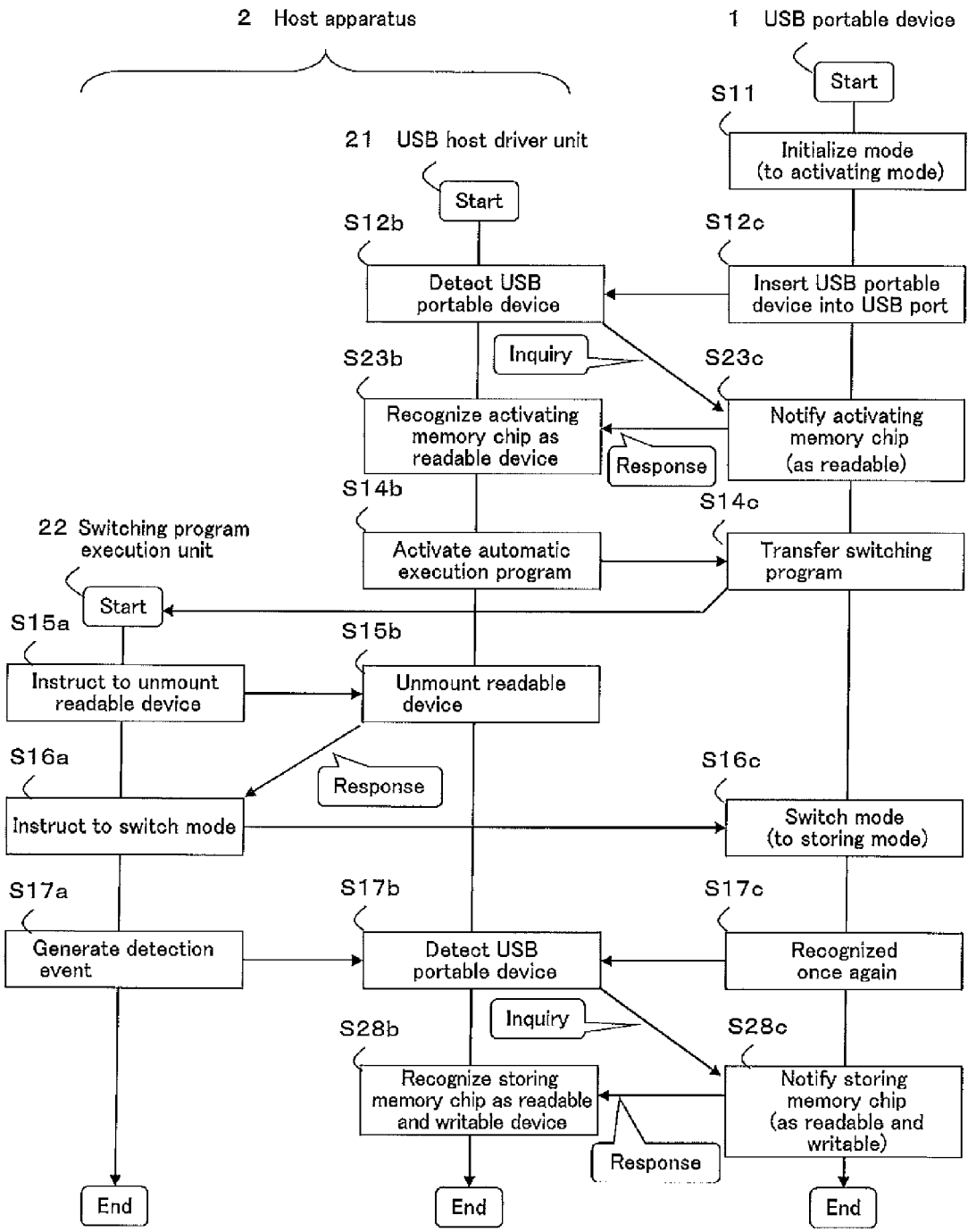
FIG. 5 A flowchart illustrating operations in which a device is recognized for each memory chip according to the second embodiment of the present invention.

FIG. 5 is a flowchart illustrating operations in which a device is recognized for each memory chip.

The USB portable device 1, before inserted in the host apparatus 2, initializes a mode thereof at an activating mode (S11). In the activating mode, the activating memory chip 13a is in the "ON" state, and the storing memory chip 13b is in the "OFF" state.

If the USB interface 19 of the USB portable device 1 is inserted into the USB port 29 of the host apparatus 2, (S12c), USB host driver unit 21 detects the inserted USB portable device 1 (S12b). Upon the detection, the USB host driver unit 21 performs recognition (enumeration) of the detected USB portable device 1. More specifically, the USB host driver unit 21 inquires of the USB portable device 1 which device is available. In response to the inquiry, the USB portable device 1 notifies the USB host driver unit 21 that the activating memory chip 13a, which is in the "ON" state, is a readable device (S23c) and that the switching program 11 stored in the readable device is an auto-run (automatic execution) program.

Upon receiving the response, the USB host driver unit 21 recognizes the activating memory chip 13a as the readable device (S23b). The USB host driver unit 21 transmits, to the USB portable device 1, a transfer instruction to activate the recognized switching program 11 in the readable device as the automatic execution program (S14b). The USB portable device 1 transfers the switching program 11 to the host apparatus 2 (S14c). The host apparatus 2 starts execution of the switching program 11, which makes the switching program execution unit 22 operate.

The switching program execution unit 22 transmits an instruction to unmount the readable device to the USB host driver unit 21 (S15a). Upon receiving the instruction, the USB host driver unit 21 unmounts the readable device recognized in S23b (S15b). Note that the switching program 11 has already been transferred to the host apparatus 2 and executed as the switching program execution unit 22. Thus, the unmount does not interrupt the execution of the switching program 11.

If the switching program execution unit 22 is notified that the unmount in S15b has been completed, the switching program execution unit 22 gives the USB portable device 1 an instruction to switch modes thereof from the activating mode in S11 to the storing mode (S16a). Following the instruction, the USB portable device 1 switches the modes to the storing mode (S16c). In the storing mode, the storing memory chip 13b is in the "ON" state, and the activating memory chip 13a is in the "OFF" state.

Upon switching to the storing mode, the controller 15 switches connections from the activating memory chip 13a to the storing memory chip 13b.

The switching program execution unit 22 generates a detection event similar to an event inserted into the USB port 29 (S12c) in order for the USB host driver unit 21 to recognize another device of the USB portable device 1 (S17a). The USB host driver unit 21 receives the detection event and detects the already-inserted USB portable device 1 once again (S17b, S17c). In response to the detection, the USB host driver unit 21 performs recognition (enumeration) of the detected USB portable device 1 for a second time.

In the second recognition (enumeration), the USB host driver unit 21 inquires of the USB portable device 1 which device is available. In response to the inquiry, the USB portable device 1 notifies the USB host driver unit 21 that the storing memory chip 13b, which is in the "ON" state, is a readable and writable device (S28c). Upon receiving the response, the USB host driver unit 21 recognizes the storing memory chip 13b as the readable and writable device (S28b).

Then, the host apparatus 2 can read and write data in the storing memory chip 13b which has already been recognized. Meanwhile, the unmounted activating memory chip 13a is not at all visible from the USB host driver unit 21 at this time. This conveniently eliminates need for reading or writing data in the activating USB peripheral 12a.

In this embodiment as described above, two areas, one which is readable in the activating memory chip 13a and the other which is readable and writable in the storing memory chip 13b can be efficiently used by switching over the two areas, while reducing fraudulent access to the activating memory chip 13a.

Figure 6:
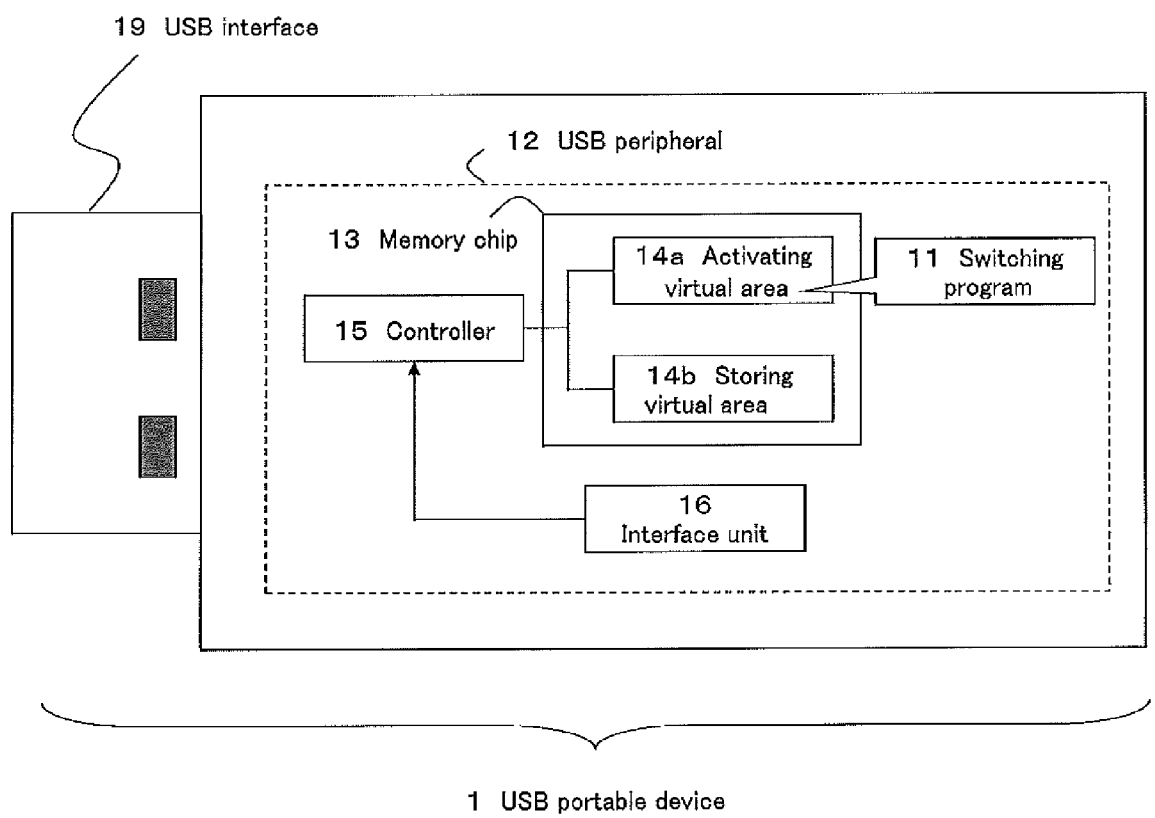
FIG. 6 A configuration diagram illustrating the USB portable device in which a device is recognized for each virtual area according to a third embodiment of the present invention.

Next is described the third embodiment. FIG. 6 is a configuration diagram illustrating the USB portable device 1 in which a device is recognized for each virtual area. The USB portable device 1 includes the USB peripheral 12. The USB peripheral 12 includes a memory chip 13 in which a plurality of virtual areas are created (an activating virtual area 14a and a storing virtual area 14b); the controller 15 controlling a read and a write of data from and into the memory chip 13; and the interface unit 16 controlling the controller 15. Note that the activating virtual area 14a corresponds to the activating storage unit 1a of FIG. 1B. The storing virtual area 14b corresponds to the storing storage unit 1b of FIG. 1B.

The controller 15 connects either one of the activating virtual area 14a or the storing virtual area 14b, to the USB interface 19. The controller 15 thus sets each of the virtual areas at either the "ON" state or the "OFF" state.

The activating virtual area 14a and the storing virtual area 14b are alternately switchable between the "ON" state and the "OFF" state. If one of the virtual areas 14a, 14b is in the "ON" state, the other is always in the "OFF state", and vice versa. In other words, it is not possible in this embodiment that both of the peripherals 12a, 12b are for example in the "ON" state at the same time.

The activating virtual area 14a stores therein the switching program 11. The switching program 11 is to be automatically run.

The interface unit 16 receives, from the switching program execution unit 22 via the USB interface 19, an instruction to designate one virtual area for being connected, from either the activating virtual area 14a or the storing virtual area 14b and operates the controller 15 according to the instruction. The interface unit 16 is recognized as, for example, a HID (Human Interface Device) class in USB standard by the USB host driver unit 21 so as to perform control communication with the host apparatus 2.

FIG. 7 is a flowchart illustrating operations in which a device is recognized for each virtual area.

The USB portable device 1, before inserted in the host apparatus 2, initializes a mode thereof at an activating mode (S11). In the activating mode, the activating virtual area 14a is in the "ON" state, and the storing virtual area 14b is in the "OFF" state.

If the USB interface 19 of the USB portable device 1 is inserted into the USB port 29 of the host apparatus 2, (S12c), USB host driver unit 21 detects the inserted USB portable device 1 (S12b). Upon the detection, the USB host driver unit 21 performs recognition (enumeration) of the detected USB portable device 1. More specifically, the USB host driver unit 21 inquires of the USB portable device 1 which device is available. In response to the inquiry, the USB portable device 1 notifies the USB host driver unit 21 that the activating virtual area 14a, which is in the "ON" state, is a readable device (S33c) and that the switching program 11 stored in the readable device is an auto-run (automatic execution) program.

Upon receiving the response, the USB host driver unit 21 recognizes the activating virtual area 14a as the readable device (S33b). The USB host driver unit 21 transmits, to the USB portable device 1, a transfer instruction to activate the recognized switching program 11 in the readable device as the automatic execution program (S14b). The USB portable device 1 transfers the switching program 11 to the host apparatus 2 (S14c). The host apparatus 2 starts execution of the switching program 11, which makes the switching program execution unit 22 operate.

The switching program execution unit 22 transmits an instruction to unmount the readable device to the USB host driver unit 21 (S15a). Upon receiving the instruction, the USB host driver unit 21 unmounts the readable device recognized in S23b (S15b). Note that the switching program 11 has already been transferred to the host apparatus 2 and executed as the switching program execution unit 22. Thus, the unmount does not interrupt the execution of the switching program 11.

If the switching program execution unit 22 is notified that the unmount in S15b has been completed, the switching program execution unit 22 gives the USB portable device 1 an instruction to switch modes thereof from the activating mode in S11 to the storing mode (S16a). Following the instruction, the USB portable device 1 switches the modes to the storing mode (S16c). In the storing mode, the storing virtual area 14b is in the "ON" state, and the activating virtual area 14a is in the "OFF" state.

Upon switching to the storing mode, the controller 15 switches connections from the activating virtual area 14a to the storing virtual area 14b.

The switching program execution unit 22 generates a detection event similar to an event generated when the USB portable device 1 is inserted into the USB port 29 (S12c) in order for the USB host driver unit 21 to recognize another device of the USB portable device 1 (S17a). The USB host driver unit 21 receives the detection event and detects the already-inserted USB portable device 1 once again (S17b, S17c). In response to the detection, the USB host driver unit 21 performs recognition (enumeration) of the detected USB portable device 1 for a second time.

In the second recognition (enumeration), the USB host driver unit 21 inquires of the USB portable device 1 which device is available. In response to the inquiry, the USB portable device 1 notifies the USB host driver unit 21 that the storing virtual area 14b, which is in the "ON" state, is a readable and writable device (S38c). Upon receiving the response, the USB host driver unit 21 recognizes the storing virtual area 14b as the readable and writable device (S38b).

Then, the host apparatus 2 can read and write data in the storing virtual area 14b which has already been recognized. Meanwhile, the unmounted activating virtual area 14a is not at all visible from the USB host driver unit 21 at this time. This conveniently eliminates need for reading or writing data in the activating USB peripheral 12*a*.

In this embodiment as described above, two areas, one which is readable in the activating virtual area 14*a* and the other which is readable and writable in the storing virtual area 14*b* can be efficiently used by switching over the two areas, while reducing fraudulent access to the activating virtual area 14*a*.

Figure 8A:
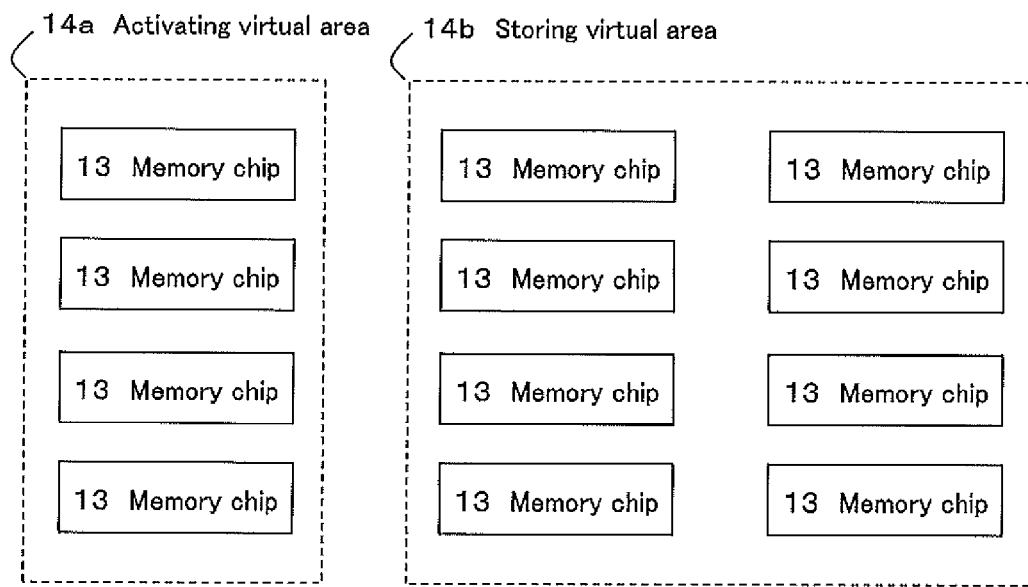
FIG. 8A and FIG. 8B Explanatory diagrams each illustrating that a virtual area is created using a plurality of memory chips according to the third embodiment of the present invention.
Figure 8B:
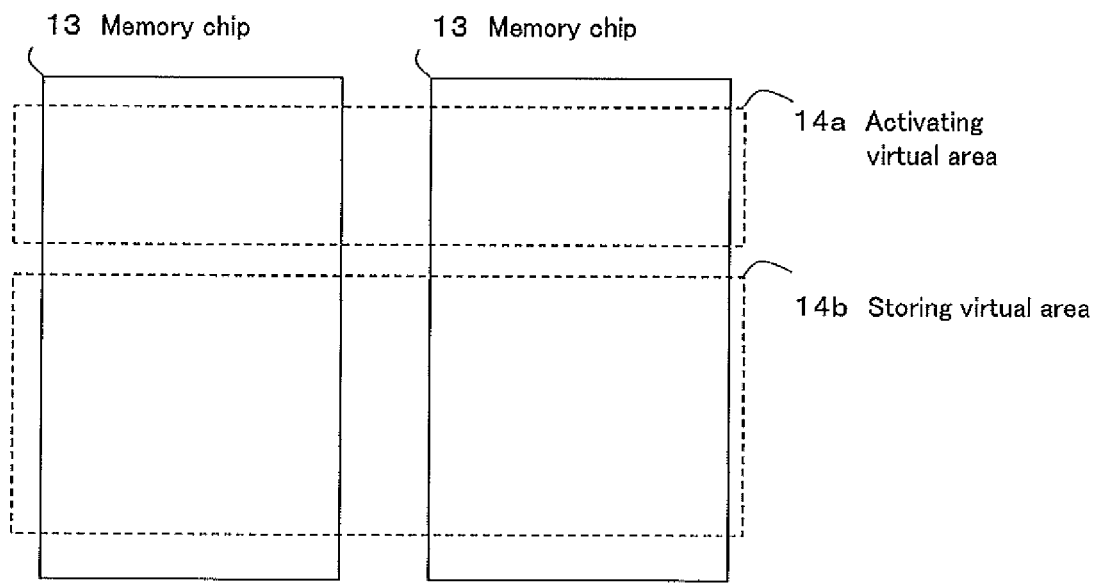

FIG. 8A and FIG. 8B are explanatory diagrams each illustrating that a virtual area is created using a plurality of memory chips. Compare FIG. 8A and FIG. 8B with FIG. 6. In FIG. 6, the activating virtual area 14*a* and the storing virtual area 14*b* share one memory chip 13. Meanwhile, in FIG. 8A, the activating virtual area 14*a* and the storing virtual area 14*b* each have a plurality of dedicated memory chips 13. In FIG. 8B, the activating virtual area 14*a* and the storing virtual area 14*b* share a plurality of memory chips 13.

In a configuration in which respective virtual areas have their dedicated memory chips 13 as in FIG. 8A, even if one memory chip 13 is damaged, only one virtual area is affected. This can improve reliability of the USB portable device 1. In FIG. 8A, the activating virtual area 14*a* is configured to have four memory chips 13 by way of example. If the switching program 11 is thus redundantly stored in a plurality of the memory chips 13, the multiply-stored memory chips 13 can improve resistance against failure.

The first to third embodiments have been explained above. Features of respective embodiments are described below.

In all of the embodiments, the switching program 11 selects and switches to one storage unit to be recognized by the USB host driver unit 21 from among a plurality of storage units. A storage unit in the OFF state is thus invisible from the USB host driver unit 21. This eliminates need of constantly controlling a fraudulent access to a storage unit in the OFF state, otherwise, for example, by means of a control of excluding an unauthorized write instruction to a readable device. As a result, fraudulent access can be prevented and security is improved without causing performance deterioration accompanied by such a constant control.

As a storage unit to be switched, the first embodiment has a plurality of USB peripherals. The second embodiment has a plurality of memory chips. And, the third embodiment has a plurality of virtual areas. Next is described a difference of advantageous effects according to a hardware configuration of each embodiment, especially focusing on manufacturing cost and reliability.

In terms of manufacturing cost of the USB portable device 1, the third embodiment costs the least of the three because a virtual area does not require additional hardware. The second embodiment costs the second least because an additional USB peripheral is not necessary but an additional memory chip is necessary. The first embodiment costs the third because both an additional peripheral and an additional memory chip thereof are necessary.

In terms of reliability of the USB portable device 1, the first embodiment is the most reliable because a hardware failure of one USB peripheral does not affect the other USB peripherals. The second embodiment is the second most reliable because a hardware failure of one memory chip does not affect the other memory chips. The third embodiment is the third because a failure of one memory chip makes all virtual areas in the memory chip unusable.

The present invention as described above can be modified and carried out in a wide range without departing from the spirit and scope of the invention as described below.

For example, an activating storage unit is a possible target for a fraudulent write, to which a prevention measure is necessary. This is because the activating storage can be recognized as a readable device by the USB host driver unit 21, though just during a very short period of time which is required for activating the switching program 11 (in FIG. 3, a time period from S13*b* to S15*b*). Even during the very short time period, there is a possibility that a fraudulent write instruction for falsifying the switching program 11 is inputted into the USB portable device 1. Therefore, an access control can be performed such that, only during the very short time period, at least one of the USB portable device 1 and the host apparatus 2 ignores any write instruction to a readable device. The access control does generate performance deterioration, however, only during the very short time period. This will pose little problem for actual operations.

Another measure for preventing a fraudulent write from being inputted into an activating storage unit is that the storage unit is configured to be a ROM (Read Only Memory) which has an attribute of being readable but unwritable. This ensures that the switching program 11 is prevented from being falsified, though making it impossible for the switching program 11 written in the ROM to be updated.

The switching program 11 switches, as a basic function thereof, a storage unit to be recognized as described above. In addition to the basic function, the switching program 11 can be configured to realize functions of various applications suitable for usage of the USB portable device 1. For example, the switching program 11 is configured to authenticate a user of the USB portable device 1 with a password entry or the like as a requirement of switching a storage unit. This can prevent those other than the user of the USB portable device 1 from inappropriately looking at data in the USB portable device 1 even if somehow obtained.

Referring to a communication path between the USB portable device 1 and the host apparatus 2, a path for controlling via the interface unit 16 and a path for data communication not via the interface unit 16 may be disposed separately. Or, the interface unit 16 may be omitted, and only the path for data communication may be used.

In the latter case, both a communication packet for controlling and a communication packet for data communication are in one path. This requires information for distinguish one communication packet from the other. The two communication packets can be distinguished by, for example, setting a prescribed flag on a communication packet for controlling and not setting the prescribed flag on a communication packet for data communication.

In the first embodiment, the controller 15 of the controlling USB peripheral 12*c* constantly monitors a communication packet communicated via the USB interface 19. The controller 15 receives a communication packet with the prescribed flag as the communication packet for controlling and transfers another communication packet without the prescribed flag to a USB peripheral which is connected to the port switch 18*b* and is in the "ON" state.

On the other hand, in the second and third embodiments, the controller 15 constantly monitors a communication packet communicated via the USB interface 19. The controller 15 receives a communication packet with a prescribed flag as the communication packet for controlling. The controller 15 receives another communication packet without the prescribed flag as a communication packet for data communication.

Referring to the storing storage unit 1*b*, one or a plurality of the storing storage units 1*b* may be used as explained in the above embodiments. If a plurality of the storing storage units 1*b* are used, only one of those storing storage units 1*b* is recognized.

The invention claimed is:

1. A USB portable device storing therein a switching program which is executed by being connected to a host apparatus, comprising:
  an activating USB functioning unit that stores the switching program in a readable and writable storage means thereof;
  a storing USB functioning unit that permits a read and a write from the host apparatus; and
  a controlling USB functioning unit that switches one of the USB functioning units recognized by the host apparatus to another one to be recognized by the host apparatus,
  wherein the controlling USB functioning unit makes the host apparatus:
    recognize the storage means of the activating USB functioning unit as a readable device upon connection of the USB portable device to the host apparatus, and
    read the switching program in the recognized readable device into, the host apparatus; then the host apparatus:
    executes the switching program read therein,
    unmounts the readable device, and
    sends a switching instruction having a prescribed flag enabled to the controlling USB functioning unit; and then the controlling USB functioning unit:
    makes the host apparatus recognize the storing USB functioning unit as a readable and writable device,
    accepts a read or write instruction having the prescribed flag disabled, and
    performs an access control in which a fraudulent write instruction to the readable device, the instruction having the prescribed flag disabled, is ignored during a time period from when the readable device is recognized by the host apparatus until when the readable device is unmounted.

2. The USB portable device according to claim 1,
  wherein the switching program executed by the host apparatus controls the host apparatus to transmit the switching instruction only if a prescribed user of the USB portable device is authenticated.

3. A USB portable device storing therein a switching program which is executed by being connected to a host apparatus, comprising:
  an activating memory chip that is a readable and writable storage means and stores therein the switching program;
  a storing memory chip that permits a read and a write from the host apparatus; and
  a controller that switches one of the memory chips recognized by the host apparatus to another one to be recognized by the host apparatus,
  wherein the controller makes the host apparatus
    recognize the activating memory chip as a readable device upon connection of the USB portable device to the host apparatus, and
    read the switching program in the recognized readable device into the host apparatus; then the host apparatus:
    executes the switching program read therein,
    unmounts the readable device, and
    sends a switching instruction, having a prescribed flag enabled, to the controller, and then the controller:
    makes the host apparatus recognize the storing memory chip as a readable and writable device,
    accepts a read or write instruction having the prescribed flag disabled, and
    performs an access control in which a fraudulent write instruction to the readable device, the instruction having the prescribed flag disabled, is ignored during a time period from when the readable device is recognized by the host apparatus until when the readable device is unmounted.

4. The USB portable device according to claim 3,
  wherein the switching program executed by the host apparatus controls the host apparatus to transmit the switching instruction only if a prescribed user of the USB portable device is authenticated.

5. A USB portable device storing therein a switching program which is executed by being connected to a host apparatus, comprising:
  an activating virtual area that is a readable and writable storage means and stores therein the switching program;
  a storing virtual area that permits a read and a write from the host apparatus; and
  a controller that switches one of the virtual areas recognized by the host apparatus to another one to be recognized by the host apparatus,
  wherein the controller makes the host apparatus:
    recognize the activating virtual area as a readable device upon connection of the USB portable device to the host apparatus, and
    read the switching program in the recognized readable device into the host apparatus; then the host apparatus:
    executes the switching program read therein,
    unmounts the readable device, and
    sends a switching instruction having a prescribed flag enabled to the controller; and then the controller:
    makes the host apparatus recognize the storing virtual area as a readable and writable device,
    accepts a read or write instruction having the prescribed flag disabled, and
    performs an access control in which a fraudulent write instruction to the readable device, the instruction having the prescribed flag disabled, is ignored during a time period from when the readable device is recognized by the host apparatus until when the readable device is unmounted.

6. The USB portable device according to claim 5,
  wherein the switching program executed by the host apparatus controls the host apparatus to transmit the switching instruction only if a prescribed user of the USB portable device is authenticated.

* * * * *